(12) United States Patent
Zhang et al.

(10) Patent No.: US 9,998,297 B2
(45) Date of Patent: Jun. 12, 2018

(54) METHOD AND APPARATUS FOR CONTROLLING SMART HOME DEVICE TO UPLOAD DATA, METHOD AND APPARATUS FOR ACQUIRING DATA UPLOADED BY SMART HOME DEVICE

(71) Applicant: Beijing Xiaomi Mobile Software Co., Ltd., Beijing (CN)

(72) Inventors: Yanlu Zhang, Beijing (CN); Ziguang Gao, Beijing (CN); Enxing Hou, Beijing (CN)

(73) Assignee: BEIJING XIAOMI MOBILE SOFTWARE CO., LTD., Haidian District, Beijing ( * ) Notice: Subject to any disclaimer, the term of this patent is extended or adjusted under 35 U.S.C. 154(b) by 0 days. days.

(21) Appl. No.: 15/299,476

(22) Filed: Oct. 21, 2016

(65) Prior Publication Data
US 2017/0346649 A1    Nov. 30, 2017

(30) Foreign Application Priority Data
May 31, 2016    (CN) .......................... 2016 1 0379293

(51) Int. Cl.
H04L 12/28 (2006.01)
H04L 29/06 (2006.01)

(52) U.S. Cl.
CPC ........ H04L 12/282 (2013.01); H04L 12/2825 (2013.01); H04L 63/08 (2013.01); H04L 63/10 (2013.01); H04L 2012/285 (2013.01); H04L 2012/2841 (2013.01)

(58) Field of Classification Search
None
See application file for complete search history.

(56) References Cited

U.S. PATENT DOCUMENTS

| | | | |
|---|---|---|---|
| 2008/0209034 A1 | 8/2008 | Shin et al. | |
| 2010/0191352 A1* | 7/2010 | Quail | H04L 12/2809 700/90 |
| 2014/0189001 A1* | 7/2014 | Tyagi | H04W 4/005 709/204 |

(Continued)

FOREIGN PATENT DOCUMENTS

| | | |
|---|---|---|
| CN | 201310554474 A | 3/2014 |
| CN | 201410091074 A | 11/2014 |

(Continued)

OTHER PUBLICATIONS

Extended European Search Report of EP 16194386.5.

(Continued)

*Primary Examiner* — Leon-Viet Nguyen
(74) *Attorney, Agent, or Firm* — Jun He Law Offices P.C.; James J. Zhu

(57) ABSTRACT

A method and an apparatus for controlling a smart home device to upload data and a method and an apparatus for acquiring data uploaded by a smart home device are provided. The method includes: acquiring operation status data of the smart home device; and according to binding relationships of the smart home device with application servers, sending the operation status data to all bound application servers; wherein the smart home device is bound to at least two application servers.

16 Claims, 7 Drawing Sheets

(56) References Cited

U.S. PATENT DOCUMENTS

| | | | |
|---|---|---|---|
| 2015/0358218 A1* | 12/2015 | Nasir | H04L 41/5025 709/224 |
| 2016/0119354 A1* | 4/2016 | Logue | H04L 63/0884 713/168 |
| 2016/0127145 A1 | 5/2016 | Fu et al. | |
| 2017/0098354 A1* | 4/2017 | Loeb | G08B 13/22 |

FOREIGN PATENT DOCUMENTS

| | | |
|---|---|---|
| CN | 201510546619 A | 1/2016 |
| CN | 201510677340 A | 1/2016 |

OTHER PUBLICATIONS

International Search Report of PCT/CN2016/092865.
Written Opinion of International Search Authority for PCT/CN2016/092865.

\* cited by examiner

METHOD AND APPARATUS FOR CONTROLLING SMART HOME DEVICE TO UPLOAD DATA, METHOD AND APPARATUS FOR ACQUIRING DATA UPLOADED BY SMART HOME DEVICE

CROSS REFERENCE TO RELATED APPLICATION

This application is based upon and claims a priority to Chinese Patent Application Serial No. 201610379293.8, filed with the State Intellectual Property Office of P.R. China on May 31, 2016, the entire contents of which are incorporated herein by reference.

TECHNICAL FIELD

The present disclosure generally relates to the field of computer communication technology, and more particularly, to a method and an apparatus for controlling a smart home device to upload data and a method and an apparatus for acquiring data uploaded by a smart home device.

BACKGROUND

As increasing smart devices go into people's lives, an application (APP) installed in a user terminal may be used to remotely control the smart device. Taking a smart home device as an example, the user may, via the application installed in the user terminal, remotely control the smart home device and view current working status of the device and the like. Typically, for the control of the smart home, a substantial proportion of control instructions are forwarded by an application server provided by an application operator. Further, data uploaded by the user terminal is, by default, stored in the application server provided by the application operator, so that the application server may perform a data analysis or provide data querying service by using the acquired data of the smart home device.

SUMMARY

According to a first aspect of embodiments of the present disclosure, a method for controlling a smart home device to upload data is provided. The method includes: acquiring operation status data of the smart home device; and according to binding relationships of the smart home device with application servers, sending the operation status data to all bound application servers; wherein the smart home device is bound to at least two application servers.

According to a second aspect of embodiments of the present disclosure, a method for acquiring data uploaded by a smart home device is provided. The method includes: receiving operation status data sent by the smart home device, and the smart home device is bound to at least two application servers, and the operation status data is response data of the smart home device to any one of bound application servers.

According to a third aspect of embodiments of the present disclosure, a smart home device is provided. The smart home device includes: a processor; and a memory configured to store an instruction executable by the processor; in which the processor is configured to: acquire operation status data of the smart home device; and according to binding relationships of the smart home device with application servers, send the operation status data to all bound application servers; wherein the smart home device is bound to at least two application servers.

It is to be understood that both the foregoing general description and the following detailed description are exemplary and explanatory only and are not restrictive of the present disclosure.

BRIEF DESCRIPTION OF THE DRAWINGS

Accompanying drawings herein are incorporated in and constitute a part of the specification, and illustrate example embodiments in line with the present disclosure, and serve to explain the principle of the present disclosure together with the description.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the invention. Instead, they are merely examples of apparatuses and methods consistent with aspects related to the invention as recited in the appended claims.

Terms used herein in the description of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It is to be understood that, although terms of "first," "second" and "third" are used for description of various information in the present disclosure, these information are not limited to these terms. These terms are only used for distinguishing information with the same type. For example, without departing from the scope of the present disclosure, the first information may also be referred to as the second information; similarly, the second information may also be referred to as the first information. Depending on the context, such as the words in the use of "if" can be interpreted as "when . . . " or "when . . . " or "response to define."

In embodiments of the present disclosure, the execution bodies may include: a user terminal, a smart home device, and at least two application servers. The above user terminal may be a smart phone, a personal digital assistant, and a wearable device such as a smart watch and a smart bracelet, etc. The above smart home device may be a home device with a communication module such as a Wi-Fi (Wireless Fidelity) module, for example, an air conditioner, a television, a refrigerator, a water heater and a rice cooker or the like. The Wi-Fi communication connection may be established between the smart home device and a router through the Wi-Fi module. The router, as a network access device in home, connects the smart home devices which access to the router respectively to the public network. In the specific implementation, the user terminal, the smart home device and the application server are independent of and interrelated with each other, and achieve commonly technical solutions provided in the present disclosure.

Figure 1:
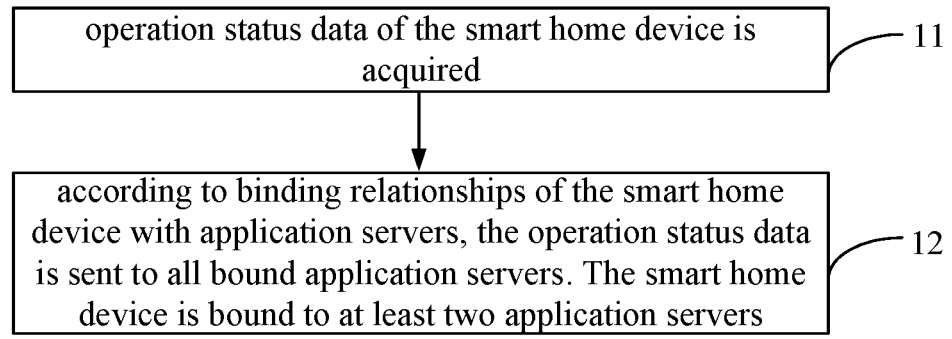
FIG. 1 is a flow chart showing a method for controlling a smart home device to upload data according to an example embodiment of the present disclosure.

FIG. 1 is a flow chart showing a method for controlling a smart home device to upload data according to an example embodiment of the present disclosure. The method is implemented by the smart home device and includes followings.

In step 11, operation status data of the smart home device is acquired.

In the present disclosure, the operation status data of the smart home device may include: time of turning on/off, device operation parameters set by a user, device maintenance parameters and the like. Assuming that the smart home device is a smart air conditioner, the operation status data may include: time of turning on/off, set temperature, wind power, maintenance frequency and the like. Software or hardware engineers may further optimize products and improve the quality and user experience of the smart home device according to the above operation status data of the smart home device.

In embodiments of the present disclosure, the smart home device may acquire the operation status data by adopting at least one of following ways.

In some embodiments, working status information of the smart home device is acquired regularly or in real-time, and the working status information is used as the operation status data.

The communication module such as the Wi-Fi communication module built in the smart home device may send request information for acquiring the device's working status to the processor of the smart home device, so as to acquire the working status information of the smart home device. Then the operation status data is generated according to the working status information. The working status information may be data detected by various sensors built in the smart home device, for example, geo-location mapping data acquired by a GPS positioning device, personnel information in the neighborhood detected by an infrared sensor, ambient temperature in the neighborhood detected by a temperature sensor, or other information.

In some embodiments, after receiving status querying information for the smart home device, working status information of the smart home device is acquired and the working status information is used as the operation status data.

In embodiments of the present disclosure, the smart home device may receive the status querying information sent by the application server in the cloud. The status querying information is configured to query the usage situation, operation situation or other information of the smart home device bound to the application server. The smart home device may acquire the working status information according to the status querying information, and further use the working status information as the operation status data.

In some embodiments, after receiving a control instruction for the smart home device, feedback information that is generated according to the implementation of the control instruction is acquired, and the feedback information is used as the operation status data.

According to relevant knowledge, the user may use the APP installed in the terminal, such as "smart home" APP installed in the smart phone, to directly send the control instruction to the smart home device via a near field communication technology (such as Wi-Fi, Bluetooth, ZigBee, etc.), or to forward the control instruction to the smart home device via public network (such as mobile cellular network, Internet, etc.). The smart home device receives the control instruction, and then may perform or refuse to perform a corresponding operation. The smart home device may generate a piece of feedback information according to the implementation of the control instruction, and use the feedback information as the operation status data. For example, the control instruction is "turning on the smart air conditioner R" or "adjusting the room temperature to 25° C.," and the corresponding module of the smart air conditioner may perform the corresponding control operation, and then generate the feedback information according to the implementation of the control operation. For example, the feedback information may be "successfully turning on the smart air conditioner R," "failing to respond, the turning on operation being not performed," or "successfully setting temperature to 25° C.," etc.

In some embodiments, the smart home device may record the related operation information performed after receiving the control instruction as one user control information record; and use the user control information record as the operation status data. The user control information record includes at least one of: a user identifier (such as account information registered in the APP), an identifier of a device sending the control instruction (such as a device identifier of the user terminal or a device identifier of the application server), instruction content, and information of control operation process.

In step 12, according to binding relationships of the smart home device with application servers, the operation status data is sent to all bound application servers. The smart home device is bound to at least two application servers.

In embodiments of the present disclosure, one smart home device at least has binding relationships with the application servers corresponding to two APPs. That is, the user may use at least two APPs to control the smart home device, i.e. the user may use two APPs installed in the user terminal to realize the control of a smart home device. Assuming that the smart home device may perform a network communication via the built-in Wi-Fi communication module, the Wi-Fi communication module may have at least two smart device communication protocols. Each smart device communication protocol supports the communication of the smart home device with an application server.

Accordingly, the smart home device may send the acquired operation status data to all bound application servers via the above Wi-Fi communication module.

In another embodiment of the present disclosure, the at least two application servers bound to the smart home device may have a relationship of authorizing account permissions to each other.

Figure 2:
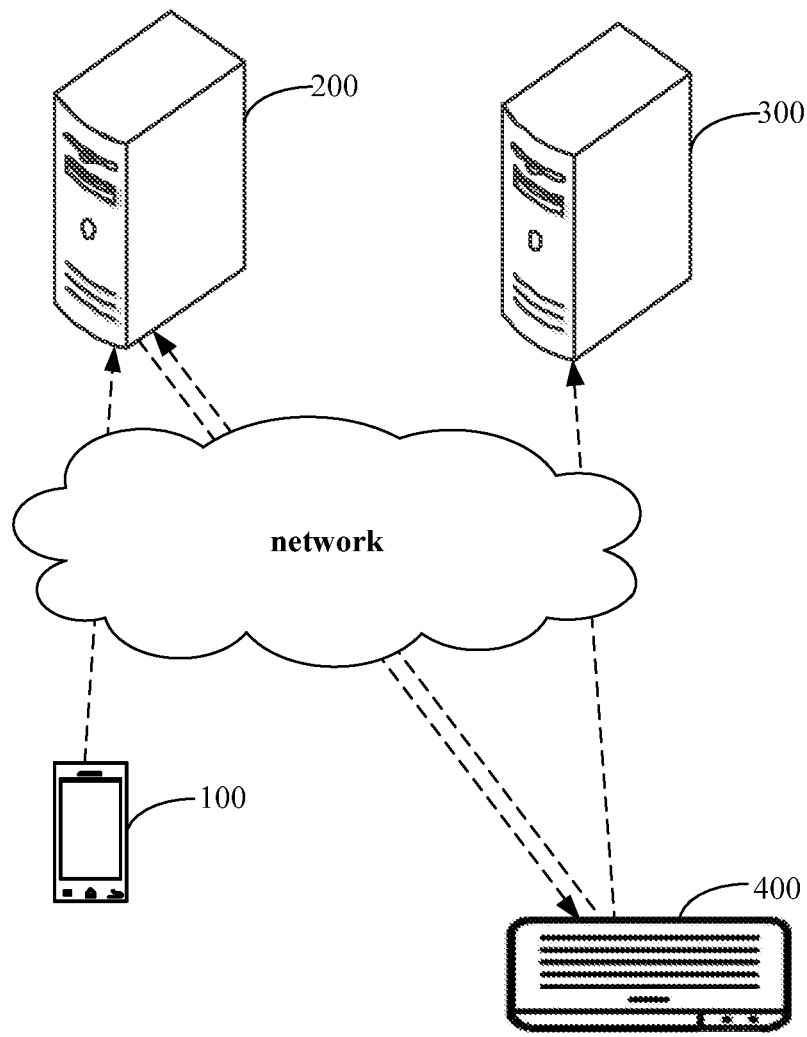
FIG. 2 is a schematic diagram illustrating an application scenario in which a smart home device is controlled to upload data according to an example embodiment of the present disclosure.

Referring to FIG. 2, which is a schematic diagram illustrating an application scenario in which a smart home device is controlled to upload data according to an example embodiment of the present disclosure. Taking the smart air conditioner 400 being the smart home device as an example, it is assumed that the smart air conditioner 400 has binding relationships with two application servers. The application servers include a first application server 200 and a second application server 300. Under normal circumstances, the user may use the phone 100 to login to a first account and control the smart air conditioner 400 intelligently via the application interface provided by the first application server 200; the user also may use the phone 100 to login to a second account and control the smart air conditioner 400 intelligently via the application interface provided by the second application server 300.

The smart air conditioner 400 may send the acquired operation status data to the first application server 200 and the second application server 300.

If the first application server 200 and the second application server 300 authorize account permissions to each other, i.e. the user may use the first account to login to the application interface provided by the second application server 300 so as to realize the intelligent control of the smart air conditioner, or the user may use the second account to login to the application interface provided by the first application server 200 so as to realize the intelligent control of the smart air conditioner 400. That is, the first account is the master account for logging in to the first application server 200, and the second account is the slave account for logging in to the first application server 200. Similarly, the second account is the master account for logging in to the second application server 300 and the first account is the slave account for logging in to the second application server 300.

As to the smart air conditioner 400, the operation status data is acquired by obtaining user control information record and using the user control information record as the operation status data. Referring to FIG. 2, i.e. the user may use a preset account to login to the smart home APP in the phone 100, and further send the control instruction to the smart home device 400 via the first application server 200. The control instruction at least includes a login account and a device identifier of the application server, and may further include a terminal identifier of the user terminal.

Figure 3:
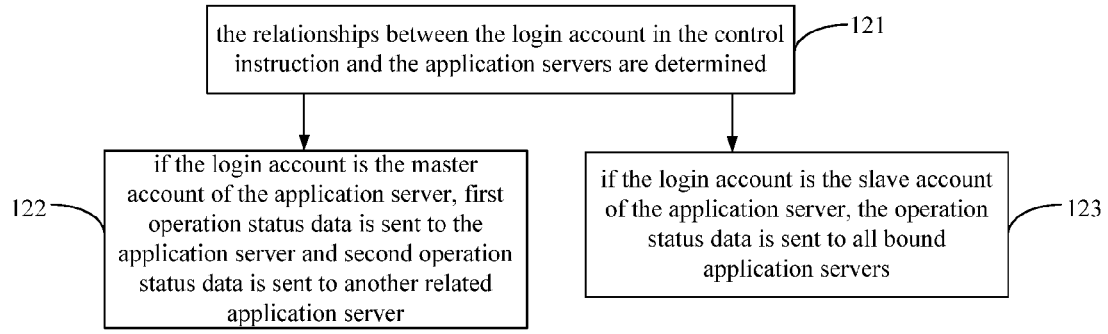
FIG. 3 is a flow chart showing another method for controlling a smart home device to upload data according to an example embodiment of the present disclosure.

Referring to FIG. 3, which is a flow chart showing another method for controlling a smart home device to upload data according to an example embodiment of the present disclosure, step 12 may include followings.

In step 121, the relationships between the login account in the control instruction and the application servers are determined.

As shown in FIG. 2, the relationship between the account currently logged in and the first application server 200 is determined.

In step 122, if the login account is the master account of the application server, first operation status data is sent to the application server and second operation status data is sent to another related application server. The second operation status data is a part of the first operation status data. The related application server is another application server bound to the smart air conditioner.

That is, the second operation status data is a partial data extracted from the first operation status data according to a predetermined strategy. The information included in the second operation status data is no more than the information included in the first operation status data.

As shown in FIG. 2, if the smart air conditioner 400 detects that the operation status data is acquired under a control mode that the user uses the first account to login to the first application server 200, the smart air conditioner 400 records the above complete user control information as the first operation status data and then sends it to the first application server 200. The smart air conditioner 400 may select a part of data from the user control information according to the predetermined strategy as the second operation status data and send it to the second application server 300.

In step 123, if the login account is the slave account of the application server, the operation status data is sent to all bound application servers.

In embodiments of the present disclosure, each application server provides the most versatile application interface only when detecting the master account.

Figure 4A:
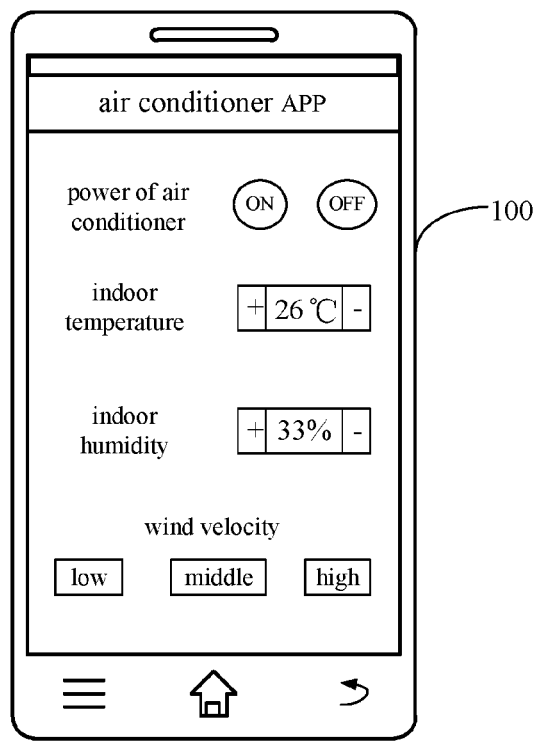
FIG. 4A is a schematic diagram illustrating another application scenario in which a smart home device is controlled to upload data according to an example embodiment of the present disclosure.
Figure 4B:
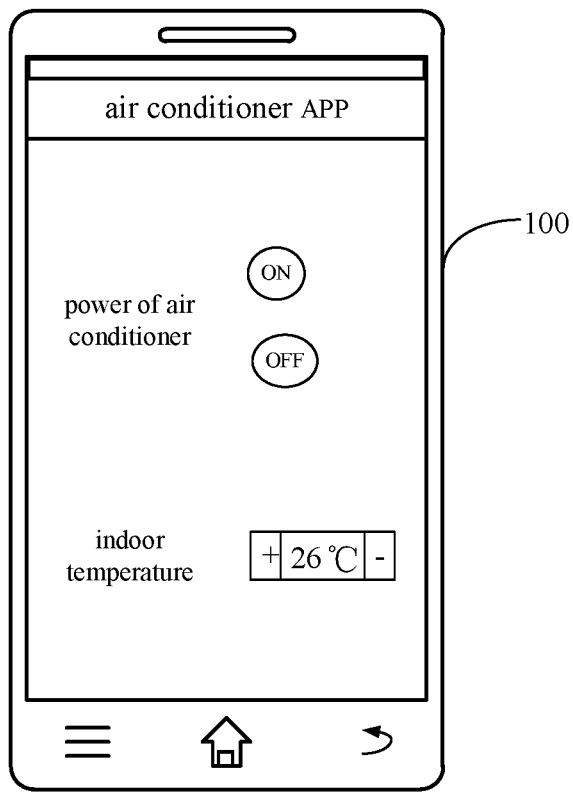
FIG. 4B is a schematic diagram illustrating another application scenario in which a smart home device is controlled to upload data according to an example embodiment of the present disclosure.

As shown in FIG. 4B, the slave application interface is provided by the first application server when the user logs in to the first application server using the second account, and the slave application interface has less functions compared to the master application interface shown in FIG. 4A provided by the first application server when the user logs in to the first application server using the first account. FIG. 4A and FIG. 4B are schematic diagrams illustrating application scenarios in which the smart home device is controlled to upload data according to an example embodiment of the present disclosure. FIG. 4A illustrates the master application interface for controlling the smart air conditioner provided by the first application server, and the user may intelligently control the turning on/off, a parameter (such as temperature, humidity, wind direction, etc.) of the smart air conditioner via this master application interface. FIG. 4B illustrates the slave application interface for controlling the smart air conditioner provided by the first application server, and the slave application interface only includes the turning on/off operation and temperature adjusting interface.

It is assumed that the mode in which the user controls the smart air conditioner via the master application interface is called as a master user operation mode, and the mode in which the user controls the smart air conditioner via the slave application interface is called as a slave user operation mode. Accordingly, compared to the master user operation mode, information of control operation process acquired by the smart air conditioner under the slave user operation mode is relatively small, and the corresponding operation status data is less.

The smart air conditioner may send the operation status data acquired under the slave user operation mode to each bound application server.

It can be seen that, with the method for controlling a smart home device to upload data according to embodiments of the present disclosure, the smart home device may send the acquired operation status data to all the application servers bound to the smart home device, thereby operators providing different application servers may share data of the smart home device. The data may include: performance parameters of the device itself or user behavior data. After the operation status data gradually forms big data, a data analysis may be performed on the big data and the acquired analysis result is configured to provide the reference for improving the product quality of the smart home device or providing better service, thereby improving the user experience of the smart home device.

Accordingly, embodiments of the present disclosure also provide a method for acquiring data uploaded by a smart home device. This method is applied in an application server, and includes: receiving operation status data sent by a smart home device, and the smart home device is bound to at least two application servers, and the operation status data is response data of the smart home device to any one of bound application servers.

In embodiments of the present disclosure, the application server which receives the operation status data may be any application server having a binding relationship with the smart home device. For example, in the application scenario shown in FIG. 2, the above application server may be the first application server 200, or may be the second application server 300.

Figure 5:
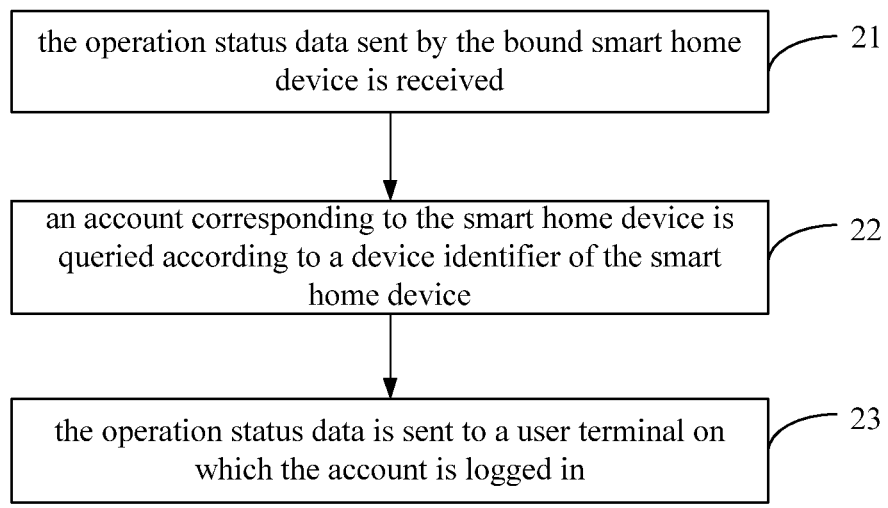
FIG. 5 is a flow chart showing a method for acquiring data uploaded by a smart home device according to an example embodiment of the present disclosure.

Referring to FIG. 5, which is a flow chart showing a method for acquiring data uploaded by a smart home device according to an example embodiment of the present disclosure, the method includes followings.

In step 21, the operation status data sent by the bound smart home device is received. The smart home device is bound to at least two application servers. The operation status data is response data of the smart home device to any one of the bound application servers.

In step 22, an account corresponding to the smart home device is queried according to a device identifier of the smart home device.

After configuring the intelligent control information of the smart home device, each application server has a list of controlled devices stored therein. The list of controlled devices includes: correspondences between user identifiers and device identifiers of smart home devices, which are shown as follow.

TABLE 1

| user identifier | device identifier of smart home device |
|---|---|
| first account | smart air conditioner M1 |
| | smart air purifier R1 |
| | smart lamp L1 |

The operation status data received by the application server at least includes the device identifier of the smart home device, and the device identifier is assumed as M1. The preset list such as Table 1 of controlled devices is queried according to the device identifier M1 of the smart air conditioner, and then it is determined that the user identifier is the first account. That is, after the user logs in to the application server using the first account, the application server may provide the application interface for controlling the smart home device.

In step 23, the operation status data is sent to a user terminal on which the account is logged in.

In embodiments of the present disclosure, the device identifier of the user terminal currently having the binding relationship with the account is queried according to the account information. After the user terminal is determined, the application server also may send the operation status data of the smart home device to the corresponding user terminal, so that the user knows timely the current operation status and other information of the smart home device, thereby improving the user experience of the user terminal.

Figure 6:
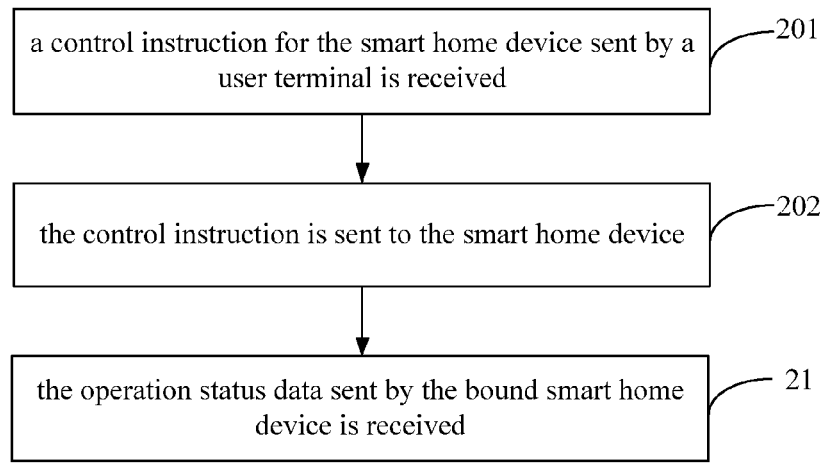
FIG. 6 is a flow chart showing another method for acquiring data uploaded by a smart home device according to an example embodiment of the present disclosure.

Referring to FIG. 6, which is a flow chart showing another method for acquiring data uploaded by a smart home device according to an example embodiment of the present disclosure, the method further includes followings before step 21.

In step 201, a control instruction for the smart home device sent by a user terminal is received.

The control instruction at least includes: a user identifier i.e. login account information, a device identifier of the smart home device, a device identifier of the application server, and instruction content.

In step 202, the control instruction is sent to the smart home device.

As to the above embodiments where the user control information record is used as the operation status data, the application server receives the control instruction for the smart home device. The control instruction is sent by the user via the user terminal. Then, the above control instruction is forwarded to the smart home device, so that the smart home device may perform the corresponding operation according to the control instruction, and generate the operation status data according to the implementation situation of the instruction, and then send the operation status data to the application server.

The embodiments shown in FIGS. 5 and 6 describe the present disclosure based on the situation that one application server only provides authorization for one account and then provides the application interface for the smart home device. In another embodiment of the present disclosure, the at least two application servers bound to the smart home device also may authorize account permissions to each other. The account permission authorization has been described in detail with reference to the schematic diagram of the application scenario shown in FIG. 2, which is not repeated herein. In the application scenario, the user operation data acquired by the application server may include a variety of situations.

For example, corresponding to the embodiment shown in FIG. 3, if the current application server which receives the operation status data sends the control instruction to the smart home device in advance, and the login account in the control instruction is the master account of the current application server, the operation status data received by the application server may include more information, i.e. the first operation status data described above.

In another example, corresponding to the embodiment shown in FIG. 3, if the current application server which receives the operation status data sends the control instruction to the smart home device in advance, and the login account in the control instruction is the slave account of the current application server, the application server may receive the operation status data including less information, i.e. the second operation status data described above.

In yet another example, if the operation status data is acquired in the above embodiments where the user control information record is used as the operation status data and the current application server does not send the control instruction to the smart home device, the operation status data received by the application server may include relatively less information.

In the present disclosure, the smart home device may send the acquired operation status data to the plurality of application servers bound to the smart home device, such that each application server may collect relevant data of the smart home device to form big data, and the application server may perform a data analysis or provide corresponding data querying service according to the big data, thereby providing references for improving the performance of the smart home device and the quality of service, and improving the user experience of the smart home device.

In the present disclosure, the method for acquiring the operation status data by the smart home device may include but be not limited to the following ways: determining the operation status data of the smart home device according to the device's working status information acquired regularly or in real-time; receiving the status querying information sent by the application server, and acquiring the working status information of the smart home device, and further determining the operation status data; after receiving the control instruction for the smart home device, acquiring the feedback information that is generated by the smart home device according to the implementation of the control instruction, and using the feedback information as the operation status data. The smart home device may send the operation status data acquired in the above ways to the application servers, such that each application server may get more abundant operation data of the smart home device, and then the application server may acquire more accurate reference information based on the above data, thereby providing services more palatable to the user habit and improving the user experience of the smart home device.

In the present disclosure, when the smart home device receives and performs the control instruction, it may record the performing process as one user control information record, and generate the operation status data according to the above user control information record and send the operation status data to each application server, such that each application server may acquire more detailed information, thereby expanding user operation data of the smart home device in each application server, further making the application server provide application reference information more suitable to the user habit. In the present disclosure, the application servers bound to the smart home device may authorize the account permissions to each other, thereby facilitating the user in controlling the smart home device. Accordingly, the terminal device may send the operation status data satisfying different requirements to respective application server according to the relationships between the login account in the control instruction and the application servers and according to requirements of different application server providers.

With respect to the foregoing method embodiments, for ease of description, a series of action combinations are given for description. However, those skilled in the art should be aware of that the present disclosure is not limited to the described action sequence, because some steps may be performed in other sequence or simultaneously according to the present disclosure.

In addition, those skilled in the art should also be aware of that embodiments described in the specification are exemplary embodiments, and the involved actions and modules are not necessarily mandatory the present disclosure.

Corresponding to method embodiments of application function realization, the present disclosure also provides apparatus embodiments and terminal embodiments of application function realization.

Figure 7:
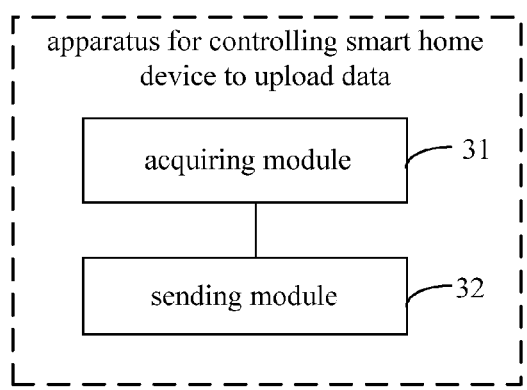
FIG. 7 is a block diagram illustrating an apparatus for controlling a smart home device to upload data according to an example embodiment of the present disclosure.

FIG. 7 is a block diagram illustrating an apparatus for controlling a smart home device to upload data according to an example embodiment of the present disclosure, the apparatus is dispoed in the smart home device and includes an acquiring module 31 and a sending module 32.

The acquiring module 31 is configured to acquire operation status data of the smart home device.

The sending module 32 is configured to, according to binding relationships of the smart home device with application servers, send the operation status data to all bound application servers, and the smart home device is bound to at least two application servers.

Figure 8:
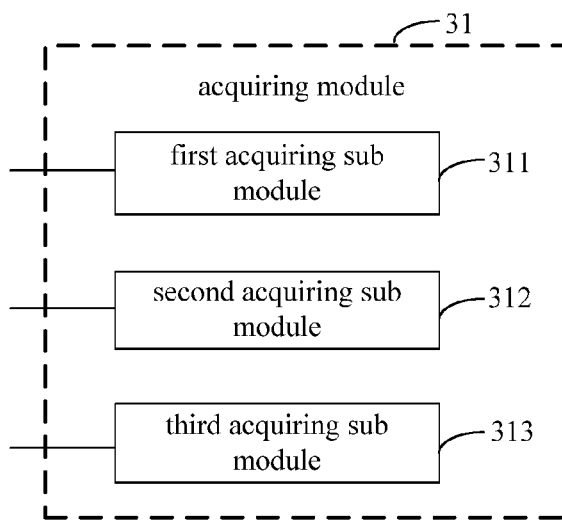
FIG. 8 is a block diagram illustrating another apparatus for controlling a smart home device to upload data according to an example embodiment of the present disclosure.

Referring to FIG. 8, which is a block diagram illustrating another apparatus for controlling a smart home device to upload data according to an example embodiment of the present disclosure. Based on the embodiment shown in FIG. 7, the acquiring module 31 may include at least one of a first acquiring sub module 311, a second acquiring sub module 312 and a third acquiring sub module 313.

The first acquiring sub module 311 is configured to acquire regularly or in real-time working status information of the smart home device as the operation status data.

The second acquiring sub module 312 is configured to, after receiving status querying information for the smart home device, acquire working status information of the smart home device as the operation status data.

The third acquiring sub module 313 is configured to, after receiving a control instruction for the smart home device, acquire feedback information that is generated according to the implementation of the control instruction and use the feedback information as the operation status data.

Figure 9:
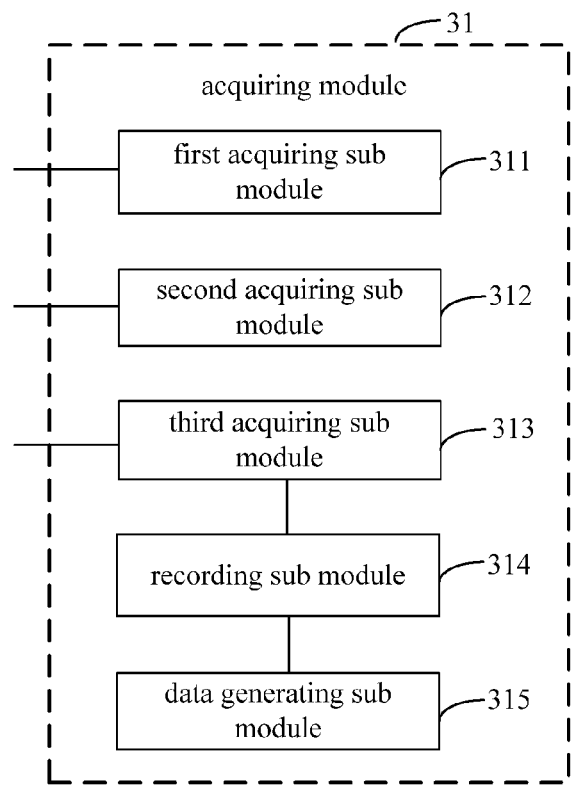
FIG. 9 is a block diagram illustrating another apparatus for controlling a smart home device to upload data according to an example embodiment of the present disclosure.

Referring to FIG. 9, which is a block diagram illustrating another apparatus for controlling a smart home device to upload data according to an example embodiment of the present disclosure. Based on the embodiment shown in FIG. 8, the acquiring module 31 may include a recording sub module 314 and a data generating sub module 315.

The recording sub module 314 is configured to generate a user control information record according to the control instruction, and the user control information record includes: a user identifier, an identifier of a device sending the control instruction, instruction content, and information of a control operation process.

Figure 10:
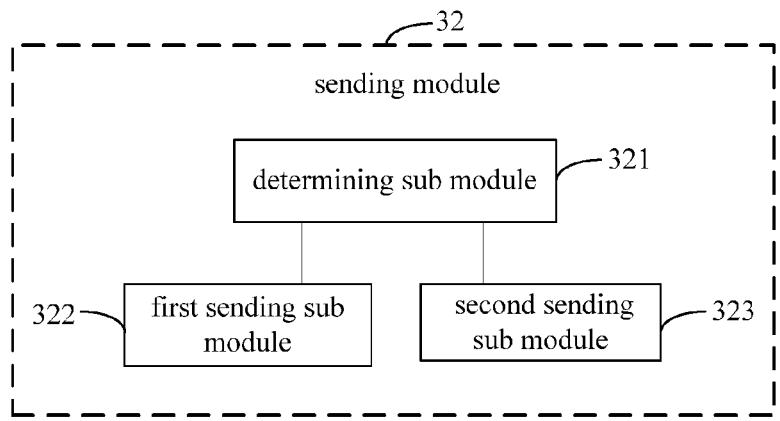
FIG. 10 is a block diagram illustrating another apparatus for controlling a smart home device to upload data according to an example embodiment of the present disclosure.

The data generating sub module 315 is configured to use the user control information record as the operation status data. In another embodiment of the present disclosure, the at least two application servers bound to the smart home device authorize account permissions to each other. Referring to FIG. 10, which is a block diagram illustrating another apparatus for controlling a smart home device to upload data according to an example embodiment of the present disclosure, and based on the embodiment shown in FIG. 9, the sending module 32 may include a determining sub module 321, a first sending sub module 322 and a second sending sub module 323.

The determining sub module 321 is configured to determine the relationships between the login account in the control instruction and the application servers.

The first sending sub module 322 is configured to send first operation status data to an application server and to send second operation status data to another related application server, if the login account is the master account of the application server. The second operation status data is part of the first operation status data. The related application server is another application server bound to the smart air conditioner.

The second sending sub module 323 is configured to send the operation status data to all bound application servers if the login account is the slave account of the application server.

Figure 11:
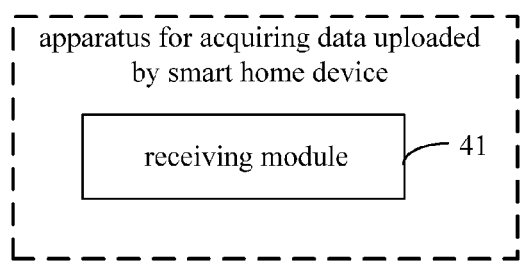
FIG. 11 is a block diagram illustrating an apparatus for acquiring data uploaded by a smart home device according to an example embodiment of the present disclosure.

Accordingly, the present disclosure also provides an apparatus for acquiring data uploaded by a smart home device, and the apparatus is disposed in an application server. Referring to FIG. 11, which is a block diagram illustrating an apparatus for acquiring data uploaded by a smart home device according to an example embodiment of the present disclosure, the apparatus may include: a receiving module 41.

The receiving module 41 is configured to receive operation status data sent by the smart home device, and the smart home device is bound to at least two application servers, and the operation status data is response data of the smart home device to any one of bound application servers.

Figure 12:
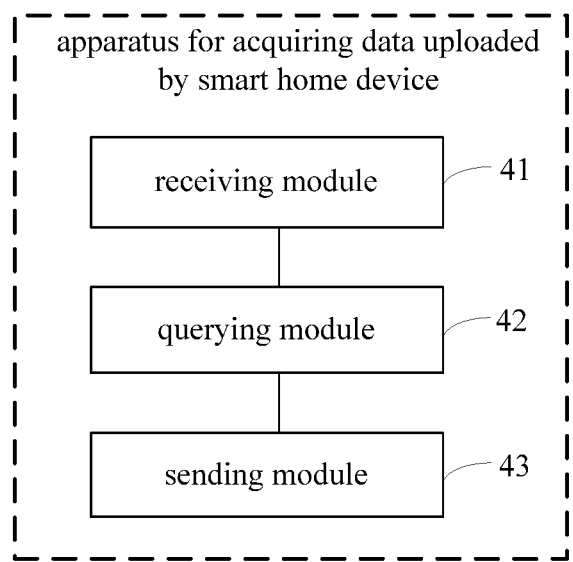
FIG. 12 is a block diagram illustrating another apparatus for acquiring data uploaded by a smart home device according to an example embodiment of the present disclosure.

Referring to FIG. 12, which is a block diagram illustrating another apparatus for acquiring data uploaded by a smart home device according to an example embodiment of the present disclosure. Based on the embodiment of the present disclosure shown in FIG. 11, the apparatus may further include a querying module 42, and a sending module 43.

The querying module 42 is configured to query an account corresponding to the smart home device according to a device identifier of the smart home device.

The sending module 43 is configured to send the operation status data to a user terminal on which the account is logged in.

Figure 13:
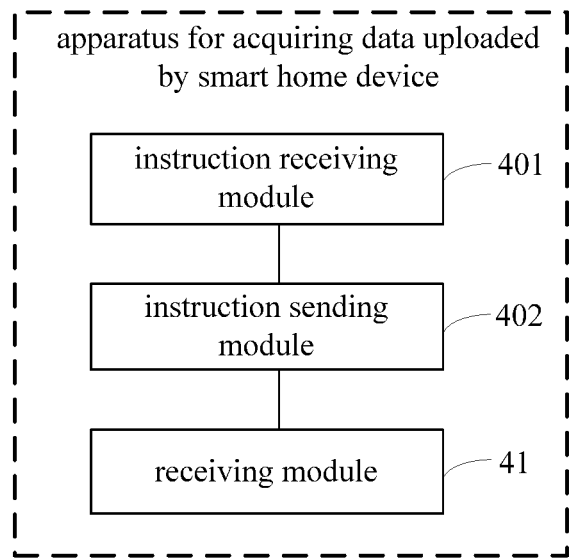
FIG. 13 is a block diagram illustrating another apparatus for acquiring data uploaded by a smart home device according to an example embodiment of the present disclosure.

Referring to FIG. 13, which is a block diagram illustrating another apparatus for acquiring data uploaded by a smart home device according to an example embodiment of the present disclosure. Based on the embodiment of the present disclosure shown in FIG. 11, besides the receiving module 41, the apparatus may further include an instruction receiving module 401 and an instruction sending module 402.

The instruction receiving module 401 is configured to receive a control instruction for the smart home device sent by a user terminal.

The instruction sending module 402 is configured to send the control instruction to the smart home device.

For the apparatus embodiments, since they substantially correspond to the method embodiments, related parts of the device embodiments are illustrated with reference to corresponding parts of the method embodiments. The above-described apparatus embodiments are merely illustrative, in which a unit as a separate component may or may not be physically separated, a component displayed as a unit may or may not be a physical unit, i.e. may be located at a place, or be distributed on multiple network units. A part or all of the modules may be selected according to practical needs so as to achieve the object of the solution of the present disclosure, which may be understood and implemented by those skilled in the art without creative labor.

Accordingly, on one hand, embodiments of the present disclosure provide a smart home device including: a processor; and a memory configured to store an instruction executable by the processor; wherein the processor is configured to: acquire operation status data of the smart home device; and according to binding relationships of the smart home device with application servers, send the operation status data to all bound application servers; wherein the smart home device is bound to at least two application servers.

On the other hand, embodiments of the present disclosure provide an application server including: a processor; and a memory configured to store an instruction executable by the processor; wherein the processor is configured to: receive operation status data sent by a smart home device, and the smart home device is bound to at least two application servers, and the operation status data is response data of the smart home device to any one of bound application servers.

Figure 14:
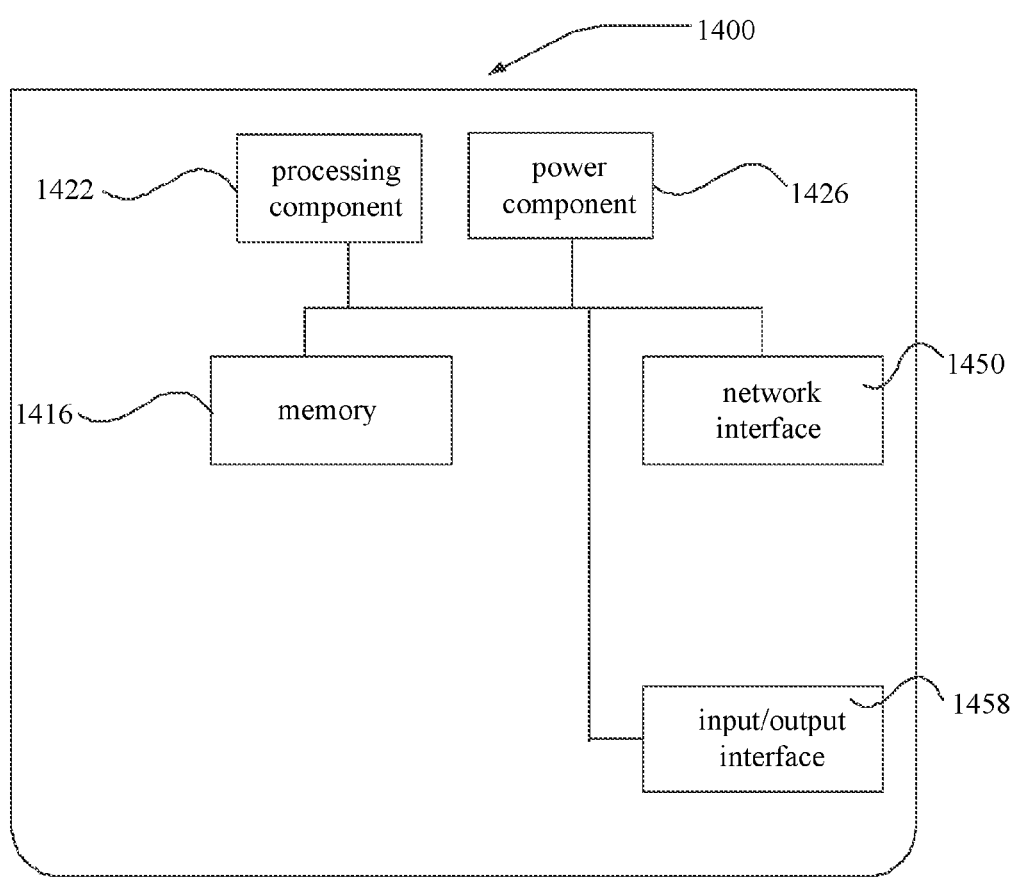
FIG. 14 is a block diagram illustrating a device for controlling a smart home device to upload data according to an example embodiment of the present disclosure.

FIG. 14 is a block diagram illustrating a device 1400 for controlling a smart home device to upload data according to an example embodiment of the present disclosure. For example, the device 1400 may be an application server or a smart home device. Referring to FIG. 14, the device 1400 may include a processing component 1422 (which further includes one or more processors), and memory resources represented by a memory 1416 for storing instructions executed by the processing component 1422, e.g., application programs. The application programs stored in the memory 1416 may include one or more modules. Each module may include a set of instructions. Further, the processing component 1422 may be configured to execute instructions, so as to perform the above methods for controlling the smart home device.

The device 1400 may also include a power component 1426 configured to execute power management of the device 1400, a wired or wireless network interface 1450 configured to connect the device 1400 to the network, an input/output interface 1458. The device 1400 may also operate based on the operating system stored in the memory 1416, such as Windows Server™, Mac OS X™, Unix™, Linux™, FreeBSD™, or the like.

In example embodiments, there is also provided a non-transitory computer readable storage medium including instructions, such as the memory 1416 including instructions. The above instructions are executable by the processing component 1422 in the device 1400, for performing the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing form the scope thereof. It is intended that the scope of the invention only be limited by the appended claims.

What is claimed is:

1. A method for controlling a smart home device to upload data, comprising:

acquiring operation status data of the smart home device; and sending the operation status data to all application servers bound to the smart home device according to binding relationships of the smart home device with application servers;

wherein the smart home device is bound to at least two application servers;

wherein, sending the operation status data to all application servers bound to the smart home device according to binding relationships of the smart home device with application servers comprises:

acquiring user operation information which includes a login account;

determining relationships among the login account, the smart home device and each application server;

when the login account is a master account logged in a first application server, sending first operation status data to the first application server and sending second operation status data to a second application server bound to the smart home device, wherein the second operation status data is part of the first operation status data; and when the login account is a slave account logged in the first application server, the operation status data is sent to all bound application servers.

2. The method according to claim 1, wherein acquiring operation status data of the smart home device comprises:

acquiring regularly or in real-time working status information of the smart home device as the operation status data.

3. The method according to claim 1, wherein, the user operation information comprises status querying information, acquiring operation status data of the smart home device comprises:

acquiring working status information of the smart home device as the operation status data after receiving status querying information for the smart home device.

4. The method according to claim 1, wherein, the user operation information comprises a control instruction, acquiring operation status data of the smart home device comprises:

acquiring feedback information as the operation status data after receiving the control instruction for the smart home device, the feedback information being generated according to the implementation of the control instruction.

5. The method according to claim 2, wherein, the user operation information comprises a control instruction, acquiring operation status data of the smart home device comprises:

generating a user control information record according to the control instruction, the user control information record comprising: a user identifier, an identifier of a device sending the control instruction, instruction content, and information of a control operation process; and using the user control information record as the operation status data.

6. The method according to claim 3, wherein, the user operation information comprises a control instruction, acquiring operation status data of the smart home device comprises:

generating a user control information record according to the control instruction, the user control information record comprising: a user identifier, an identifier of a device sending the control instruction, instruction content, and information of a control operation process; and using the user control information record as the operation status data.

7. The method according to claim 4, wherein acquiring operation status data of the smart home device comprises:

generating a user control information record according to the control instruction, the user control information record comprising: a user identifier, an identifier of a device sending the control instruction, instruction content, and information of a control operation process; and using the user control information record as the operation status data.

8. The method according to claim 1, wherein the at least two application servers bound to the smart home device authorize account permissions to each other.

9. A smart home device, comprising:

a processor; and a memory configured to store an instruction executable by the processor;

wherein the processor is configured to:

acquire operation status data of the smart home device; and send the operation status data to all application servers bound to the smart home device according to binding relationships of the smart home device with application servers;

wherein the smart home device is bound to at least two application servers;

wherein, sending the operation status data to all application servers bound to the smart home device according to binding relationships of the smart home device with application servers comprises:

acquiring user operation information which includes a login account;

determining relationships among the login account, the smart home device and each application server;

when the login account is a master account logged in a first application server, sending first operation status data to the first application server and sending second operation status data to a second application server bound to the smart home device, wherein the second operation status data is part of the first operation status data; and when the login account is a slave account of logged in the first application server, the operation status data is sent to all bound application servers.

10. The smart home device according to claim 9, wherein the processor is configured to acquire operation status data of the smart home device by acquiring regularly or in real-time working status information of the smart home device as the operation status data.

11. The smart home device according to claim 9, wherein, the user operation information comprises status querying information, the processor is configured to acquire operation status data of the smart home device by acquiring working status information of the smart home device as the operation status data after receiving status querying information for the smart home device.

12. The smart home device according to claim 9, wherein, the user operation information comprises a control instruction, the processor is configured to acquire operation status data of the smart home device by acquiring feedback information as the operation status data after receiving the control instruction for the smart home device, the feedback information being generated according to the implementation of the control instruction.

13. The smart home device according to claim 10, wherein, the user operation information comprises a control instruction, the processor is configured to acquire operation status data of the smart home device by acts of:
generating a user control information record according to the control instruction, the user control information record comprising: a user identifier, an identifier of a device sending the control instruction, instruction content, and information of a control operation process; and
using the user control information record as the operation status data.

14. The smart home device according to claim 11, wherein, the user operation information further comprises a control instruction, the processor is configured to acquire operation status data of the smart home device by acts of:
generating a user control information record according to the control instruction, the user control information record comprising: a user identifier, an identifier of a device sending the control instruction, instruction content, and information of a control operation process; and
using the user control information record as the operation status data.

15. The smart home device according to claim 12, wherein the processor is configured to acquire operation status data of the smart home device by acts of:
generating a user control information record according to the control instruction, the user control information record comprising: a user identifier, an identifier of a device sending the control instruction, instruction content, and information of a control operation process; and
using the user control information record as the operation status data.

16. The smart home device according to claim 9, wherein the at least two application servers bound to the smart home device authorize account permissions to each other.

* * * * *